(12) United States Patent
Tohyama (10) Patent No.: US 6,229,909 B1
(45) Date of Patent: *May 8, 2001

(54) PATTERN DATA MATCHING DEVICE FOR MATCHING MULTIPLE SETS OF PATTERN DATA EFFICIENTLY AND ITS MATCHING METHOD

(75) Inventor: Noriko Tohyama, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/113,564

(22) Filed: Jul. 10, 1998

(30) Foreign Application Priority Data

Jul. 11, 1997 (JP) ........................................ 9-202432

(51) Int. Cl.[7] ...................................................... G06K 9/00
(52) U.S. Cl. ........................................... 382/124; 382/220
(58) Field of Search ................................. 382/124–127, 382/115, 117, 118, 220, 305; 340/825.34; 356/71; 902/3, 6; 713/186

(56) References Cited

U.S. PATENT DOCUMENTS

| | | | |
|---|---|---|---|
| 5,067,162 | * | 11/1991 | Driscoll, Jr. et al. .................... 382/5 |
| 5,559,895 | * | 9/1996 | Lee et al. .............................. 382/119 |
| 5,872,871 | * | 2/1999 | Yokoyama et al. ................... 382/292 |
| 5,901,238 | * | 5/1999 | Matsushita ........................... 382/117 |

FOREIGN PATENT DOCUMENTS

| | | | |
|---|---|---|---|
| 59-2183 | | 1/1984 | (JP) ................................ G06K/9/00 |
| 63-000782 | * | 1/1988 | (JP) ................................ G06K/9/68 |
| 63-53588 | | 10/1988 | (JP) ................................ G06F/15/70 |

* cited by examiner

*Primary Examiner*—Leo Boudreau
*Assistant Examiner*—Brian P. Werner
(74) *Attorney, Agent, or Firm*—McGinn & Gibb, PLLC (57) ABSTRACT

A pattern data matching device comprises multiple target pattern data storing parts for storing target pattern data transferred from the matching controller, a file pattern data storing part for storing file pattern data transferred from the matching controller, and a data processing part for matching a necessary set of target pattern data among multiple sets of target pattern data stored in the multiple target pattern storing parts against file pattern data stored in the file pattern storing part.

12 Claims, 5 Drawing Sheets

PATTERN DATA MATCHING DEVICE FOR MATCHING MULTIPLE SETS OF PATTERN DATA EFFICIENTLY AND ITS MATCHING METHOD

BACKGROUNDS OF THE INVENTION

1. Field of the Invention

The present invention relates to a pattern data matching device for defining characteristic points that are established as appropriate within a pattern represented by finger print or palm print data, and matching pattern data to be verified (hereinafter referred to as "target pattern data") against pattern data that are prepared beforehand (hereinafter referred to as "file pattern data") based on such characteristic points data, as well as to its matching method.

2. Description of the Prior Art

A pattern data matching device verifies by matching target pattern data against file pattern data in order to extract data that coincide with or resemble target pattern data from a massive amount of file pattern data. Conventional devices for this purpose are disclosed, for example, in Japanese Patent Laying-Open (Kokai) No. Showa 63-53588, entitled "Data Matching System" and Japanese Patent Laying-Open (Kokai) No. Showa 59-2183, entitled "Finger Print Matching Device."

Japanese Patent Laying-Open No. Showa 63-53588 describes a matching device for implementing a highly reliable matching process that can reduce time required for the entire matching process by including a fast matching means for matching target pattern data against file pattern data at a low precision and a matching means for matching at a high precision, and after excluding file pattern data that have been determined not to coincide with or resemble target pattern data from the subject of verification, conducting high-precision verification.

Japanese Patent Laying-Open No. Showa 59-2183 describes a matching device that requires only a small storage capacity in a storing means, resulting in the overall compactness and reduced manufacturing costs, by including a storing means for storing all-linked data resulting from linking all characteristic points present in patterns within target pattern data, a storing means for storing all-linked data resulting from linking all characteristic points present in patterns within file pattern data, and a comparing means for comparing all-linked data associated with target pattern data with all-linked data associated with file pattern data.

Figure 6:
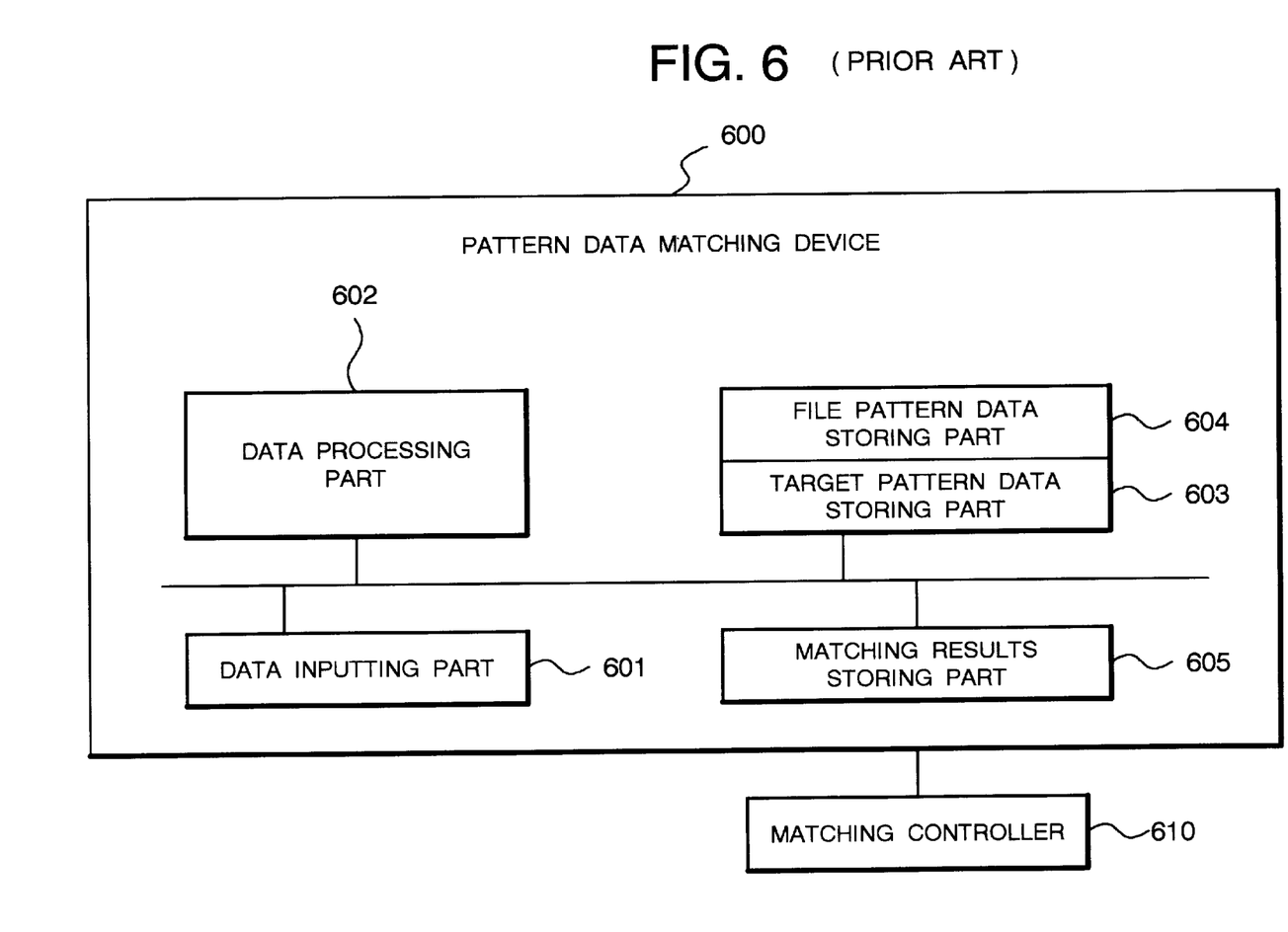
FIG. 6 is a block diagram showing the configuration of a conventional pattern data matching device.

FIG. 6 is a block diagram showing the configuration of a conventional pattern data matching device. With reference to FIG. 6, a pattern data matching device 600 is connected to a matching controller 610 for transferring target pattern data and file pattern data to the pattern data matching device 600, and includes a data inputting part for storing temporarily data transferred from the matching controller 610, a target pattern data storing part 603 for storing target pattern data being stored temporarily in the data inputting part 601 after converting them into a data format suited for a matching process, a file pattern data storing part 604 for storing file pattern data being stored temporarily in the data inputting part 601 after converting them into a data format suited for processing on a pattern data processing device, a verification results storing part 605 for storing results obtained by matching target pattern data against file pattern data, and a data processing part 602 for controlling a part for executing the individual functions mentioned above and performing the matching process. The target pattern data storing part 603 and the file pattern data storing part 604 store one set of target pattern data or file pattern data, respectively.

The matching controller 610 includes a database that stores all file pattern data that have been prepared for matching pattern data and a database for inputting and storing target pattern data that are the subject of verification; it transfers file pattern data and target pattern data to the pattern data matching device 600 sequentially and receives the results of verification.

Operation of the above-described conventional pattern data matching device will be detailed below. First, the matching controller 610 transfers target pattern data that are the subject of verification to the pattern data matching device 600. In accordance with the control by the data processing part 602, the pattern data matching device 600 stores the target pattern data that it has received from the matching controller 601 in the data inputting part 601. Then, the data processing part 602 converts the target pattern data that are stored in the data inputting part 601 into a data format suitable for a matching process, and stores them in the target pattern data storing part 603.

Next, the matching controller 610 transfers file pattern data to the pattern data matching device 600. In accordance with the control by the data processing part 602, the pattern data matching device 600 stores the file pattern data that it has received from the matching controller 601 in the data inputting part 601. Then, the data processing part 602 converts the file pattern data that are stored in the data inputting part 601 into a data format suitable for a matching process, and stores them in the file pattern data storing part 604.

Next, the data processing part 602 verifies target pattern data that are stored in the target pattern data storing part 603 against the file pattern data that are stored in the file pattern data storing part 604, and stores the results of verification, that is, the information that indicates whether the target pattern data and the file pattern data coincide with or resemble each other or not, in the verification results storing part 605.

The matching controller 610 transfers the file pattern data stored in the database to the pattern data matching device 600 sequentially, and on completion of matching the data against all the file pattern data, receives the results of matching such target pattern data against each of the file pattern data stored in the verification results storing part 605. The matching controller 610 repeats the same operation on other target pattern data that are stored in the database. These verification results received by the matching controller 610 are utilized for various purposes, including authentication systems for ensuring security and investigations into criminal cases.

Figure 7:
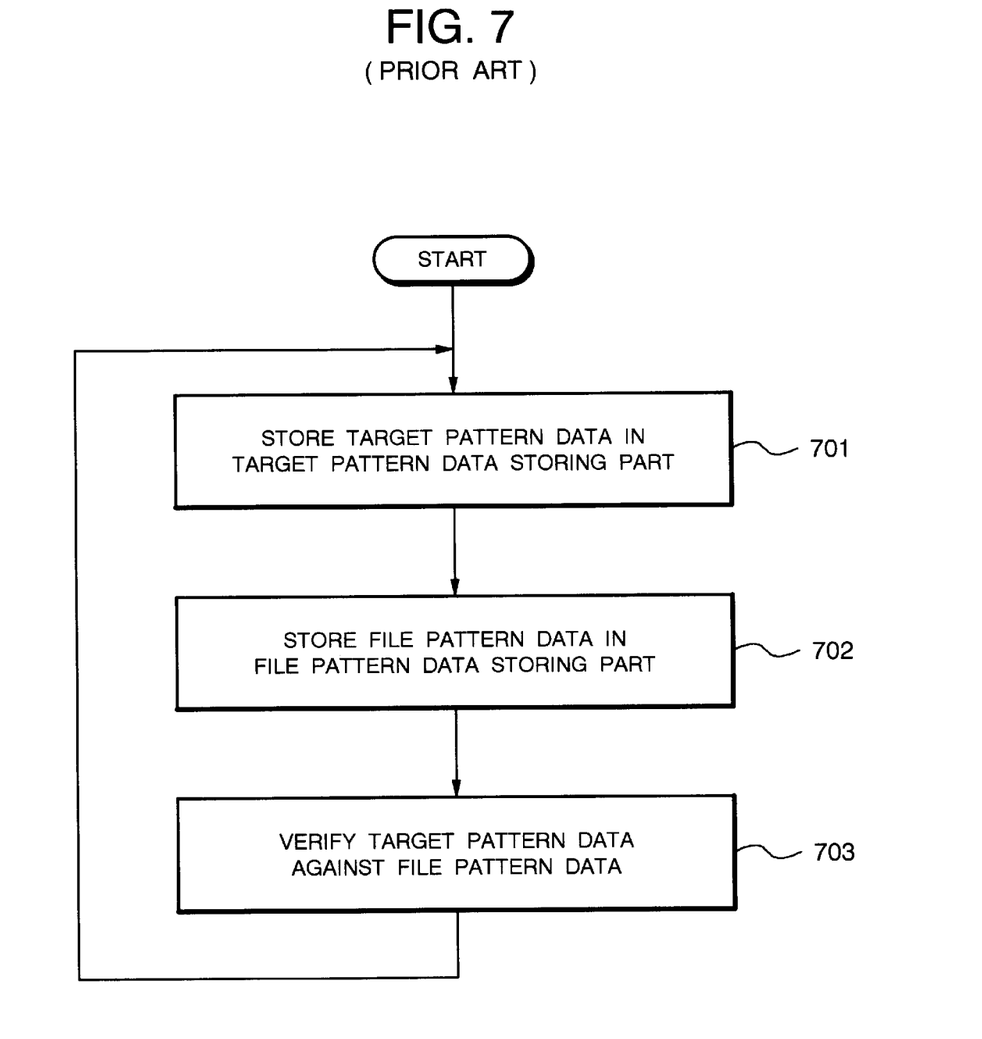
FIG. 7 is a flowchart showing the operation of a conventional pattern data matching device.

FIG. 7 shows the flow of the process that takes places in the above-mentioned pattern data matching device 600. With reference to FIG. 7, in one cycle of the matching process, the pattern data matching device 600 verifies one set of target pattern data against one set of file pattern data. More specifically, the process, wherein it stores the target pattern data in the target pattern data storing part 603 (Step 701), stores the file pattern data in the file pattern data storing part 604 (Step 702), and verifies the target pattern data against file pattern data (Step 703), is repeated for every set of target pattern data and every set of file pattern data.

Thus, when performing the matching process on multiple sets of target pattern data, a wasteful process, wherein the same file pattern data are transferred repeatedly from the matching controller 610 to the pattern data matching device 600, and, in the pattern data matching device 600, they are transferred repeatedly from the data inputting part 601 for storage in the file pattern data storing part 604, must be carried out, leading to the drawback of lower efficiency.

SUMMARY OF THE INVENTION

An object of the present invention is to provide a pattern data matching device which can eliminate the wasteful process of transferring the same file pattern data repeatedly in performing verification on multiple sets of target pattern data, thereby reducing the time required for the matching process and consequently increasing efficiency, as well as to provide its matching method.

According to one aspect of the invention, a pattern data matching device for matching target pattern data which are pattern data taken for verification against file pattern data which are pattern data prepared beforehand for verification, comprises multiple target pattern data storing means for storing the target pattern data transferred from the matching controller, a file pattern data storing means for storing the file pattern data transferred from the matching controller, and a matching means for matching one necessary set of the target pattern data stored in the multiple target pattern data storing means against the file pattern data stored in the file pattern data storing means.

In the preferred construction, when designation information that designates the target pattern data to be verified is included in the file pattern data, the matching means verifies the target pattern data indicated in such designation information against the file pattern data.

In the preferred construction, the pattern data matching device further comprises a data holding means for storing the target pattern data transferred from the matching controller and the file pattern data temporarily, wherein the target pattern data and the file pattern data stored in the data holding means are converted as necessary into a data format that is handled by the matching means, and are stored in the target pattern data storing means and the file pattern data storing means.

In another preferred construction, the pattern data matching device further comprises a data holding means for storing the target pattern data transferred from the matching controller and the file pattern data temporarily, wherein the target pattern data and the file pattern data stored in the data holding means are converted as necessary into a data format that is handled by the matching means, and are stored in the target pattern data storing means and the file pattern data storing means, and when designation information that designates the target pattern data to be verified is included in the file pattern data, the matching means verifies the target pattern data indicated in such designation information against the file pattern data.

According to another aspect of the invention, a data matching method in a pattern data matching device for matching target pattern data which are pattern data taken for verification against file pattern data which are pattern data prepared beforehand for verification, comprising the steps of transferring multiple sets of the target pattern data from the matching controller and storing the multiple sets of the target pattern data, transferring the file pattern data from the matching controller and storing the file pattern data, and matching necessary target pattern data of the multiple target pattern data stored against the file pattern data.

In the preferred construction, the data matching method further comprises the step of before conducting the data matching step, and when the file pattern data stored includes designation information that designates the target pattern data to be verified, determining the target pattern data to be verified against the file pattern data in accordance with such designation information.

In the preferred construction, in the step of storing the target pattern data and the step of storing the file pattern data, the target pattern data and the file pattern data transferred from the matching controller are converted as necessary into a data format that is handled by the data matching step and are stored.

In the preferred construction, in the step of storing the target pattern data and the step of storing the file pattern data, the target pattern data and the file pattern data transferred from the matching controller are converted as necessary into a data format that is handled by the data matching step and are stored, and further comprising the step of, before conducting the data matching step, and when the file pattern data stored includes designation information that designates the target pattern data to be verified, determining the target pattern data to be verified against the file pattern data in accordance with such designation information.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
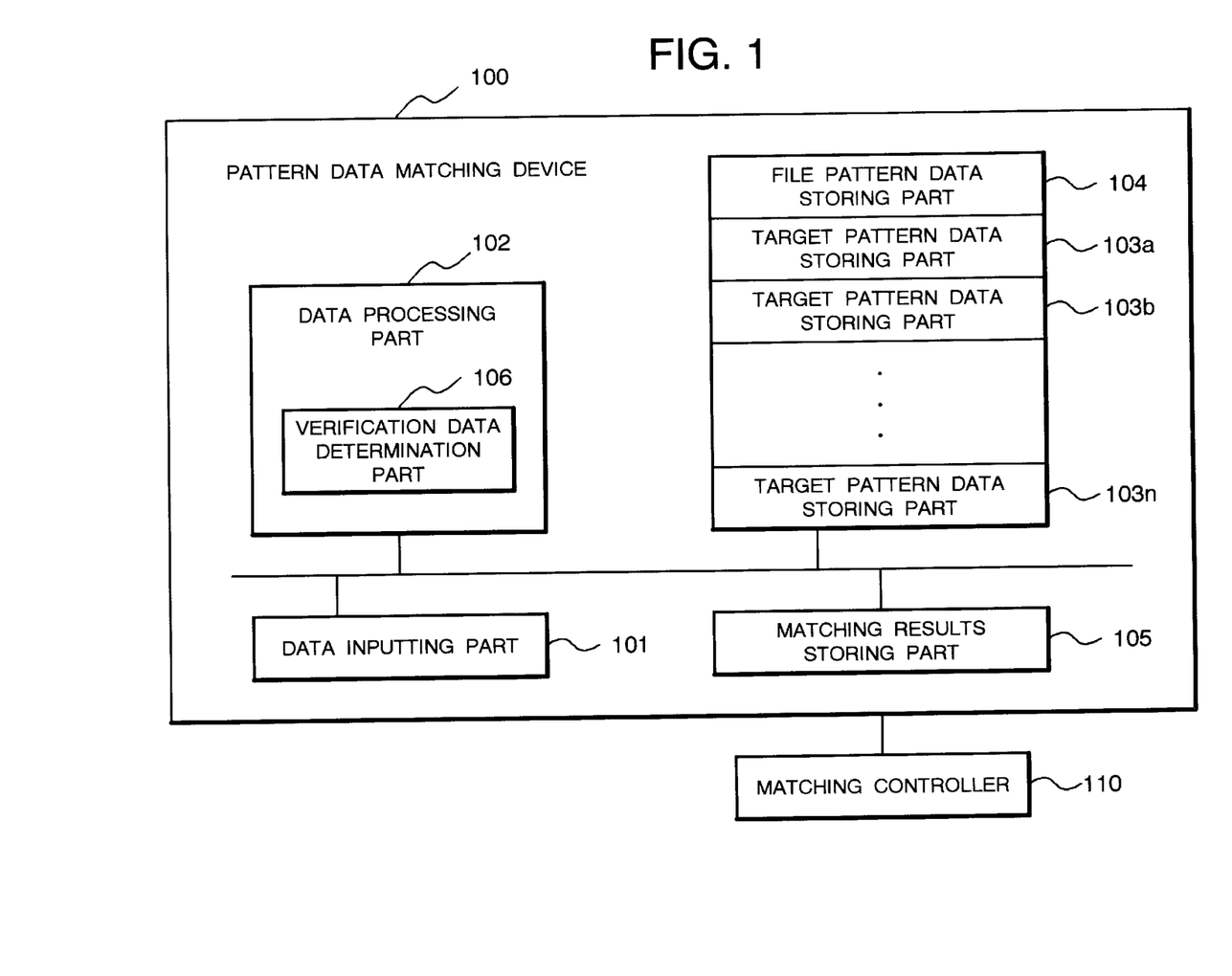
FIG. 1 is a block diagram showing the configuration of a pattern data matching device according to one embodiment of the present invention.

FIG. 1 is a block diagram showing the configuration of a pattern data matching device according to one embodiment of the present invention. With reference to FIG. 1, the pattern data matching device 100 according to the present embodiment is connected to a matching controller 110 for transferring target pattern data and file pattern data to the pattern data matching device 100, and includes a data inputting part 101 for storing temporarily data transferred from the matching controller 110, multiple target pattern data storing parts 103a to 103n for storing target pattern data being stored temporarily in the data inputting part 101 after converting them into a data format suited for a matching process, a file pattern data storing part 104 for storing file pattern data being stored temporarily in the data inputting part 101 after converting them into a data format suited for processing on a pattern data processing device, a verification results storing part 105 for storing results obtained by matching target pattern data against file pattern data, and a data processing part 102 for controlling a part for executing the individual functions mentioned above and performing the required matching process. In addition, the data processing part 102 includes a verification data determining part 106 for determining which one of the multiple target pattern data being stored in the target pattern data storing parts 103a to 103n should be verified against file pattern data. In FIG. 1, illustration is made only of a characteristic part of the configuration of the present embodiment but not of the remaining common part.

One set of target pattern data is stored in each of the target pattern data storing parts 103a to 103n, and one set of file pattern data is stored in the file pattern data storing part 104. Thus, in the pattern data matching device 100 according to the present embodiment, n sets of target pattern data can be stored for one cycle of the matching process.

The pattern data matching device 100 according to the present embodiment is implemented using a workstation, personal computer, or other type of computer. The computer program for controlling the computer is provided stored on a magnetic or optical disc, a semiconductor memory, or other common storage medium, and after being loaded in the data processing part 102 of the pattern data matching device 100, carries out various kinds of control and processes.

Figure 2:
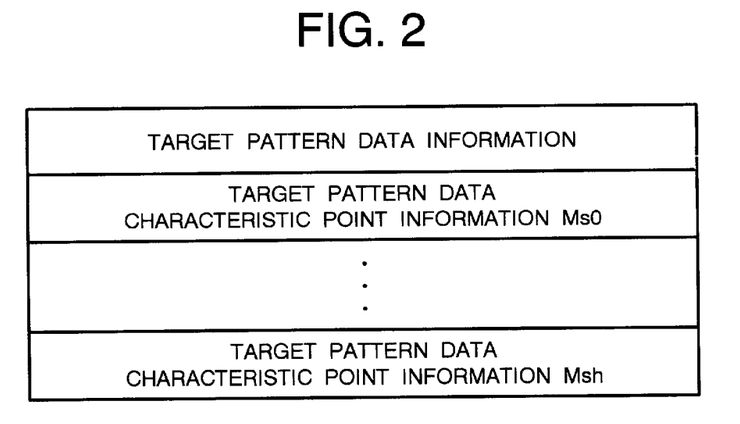
FIG. 2 is a diagram showing the configuration of target pattern data used for the present embodiment.
Figure 3:
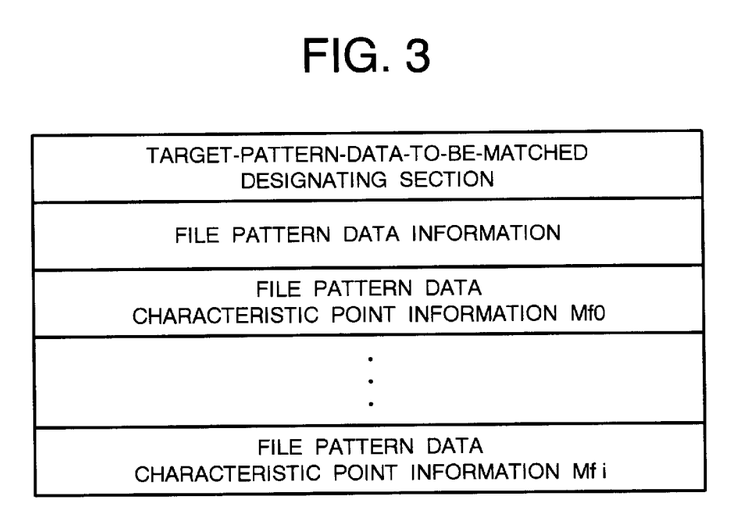
FIG. 3 is a diagram showing the configuration of file pattern data used for the present embodiment.

The matching controller 110 includes a database that stores all file pattern data prepared for matching pattern data and a database for inputting and storing target pattern data that are the subject of verification; it transfers file pattern data and target pattern data to the pattern data matching device 100 sequentially and receives the results of verification. FIG. 2 and FIG. 3 show the configuration of target pattern data and that of file pattern data, respectively.

With reference to FIG. 2, the target pattern data comprises target pattern data information and multiple pieces of target pattern data characteristic point information Ms0 to Msh. The target pattern data information is formal information that is required for evaluating a pattern, such as information concerning areas and coordinates of a pattern on a screen and the number of characteristic points contained in a pattern. The target pattern data characteristic points information Ms0 to Msh is information concerning types and positions of characteristic points that have been established as appropriate within a pattern of target pattern data. Characteristic points are those points that characterize the shape of a pattern, including points at which multiple lines intersect each other, vertexes of triangles, and centers of circular arcs, and can be defined as appropriate for the type of pattern to be verified (for example, finger print or palm print).

Figure 4:
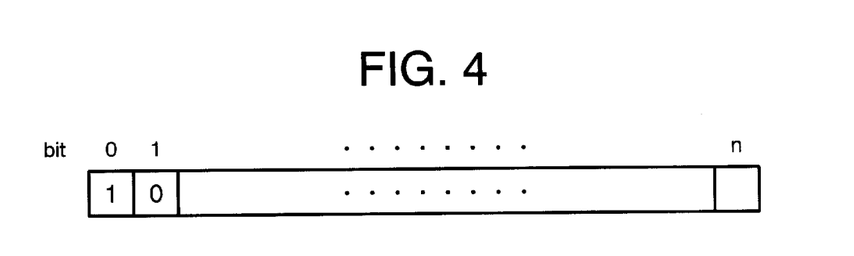
FIG. 4 is a diagram showing the configuration of a pattern-data-to-be-verified designating section in the file pattern data in FIG. 3.

With reference to FIG. 3, a set of file pattern data comprises a target-pattern-data-to-be-verified designating section, file pattern data information, and file pattern data characteristic point information Mf0 to Mfi. Of these, the contents of file pattern data information and file pattern data characteristic point information Mf0 to Mfi are the same as those of target pattern data information and multiple pieces of target pattern data characteristic point information Ms0 to Msh in target pattern data. FIG. 4 shows the configuration of the target-pattern-data-to-be-verified designating section.

With reference to FIG. 4, the target-pattern-data-to-be-verified designating section has the same number of bits as the number of target pattern data storing parts 103a to 103n, with each bit made to correspond to each of the target pattern data storing parts 103a to 103n; the section indicates whether the data stored in each of the target pattern data storing parts 103a to 103n should be verified against the related file pattern data, using "1" or "0" data (flag) that is recorded in the corresponding bit. For example, when the bit datum is "1", verification is made between the corresponding one of the target pattern data storing parts 103a to 103n and the related file pattern data; when the bit datum is "0", verification is not made. Bit 0 designates whether or not verification should be made on the first target pattern data storing part 103a; Bit 1 designates whether or not verification should be made on the second target pattern data storing part 103b. Since the target-pattern-data-to-be-verified designating section in FIG. 4 gives "1" as Bit 0 datum and "0" as Bit 1 datum, the related file pattern data are verified against the target pattern data stored in the target pattern data storing part 103a, but not against the target pattern data stored in the target pattern data storing part 103b. The same applies to the following bits.

In the pattern data matching device 100, the verification data determination part 106 checks the target-pattern-data-to-be-verified designating section in the file pattern data sequentially, beginning with Bit 0 and ending with Bit n. When the bit datum is "1", it directs the data processing part 102 to match target pattern data stored in the corresponding one of the target pattern data storing parts 103a to 103n against the related file pattern data; when the bit datum is "0", it moves to the next bit datum to check without matching the target pattern data stored in the corresponding one of the target pattern data storing parts 103a to 103n against the related file pattern data.

Figure 5:
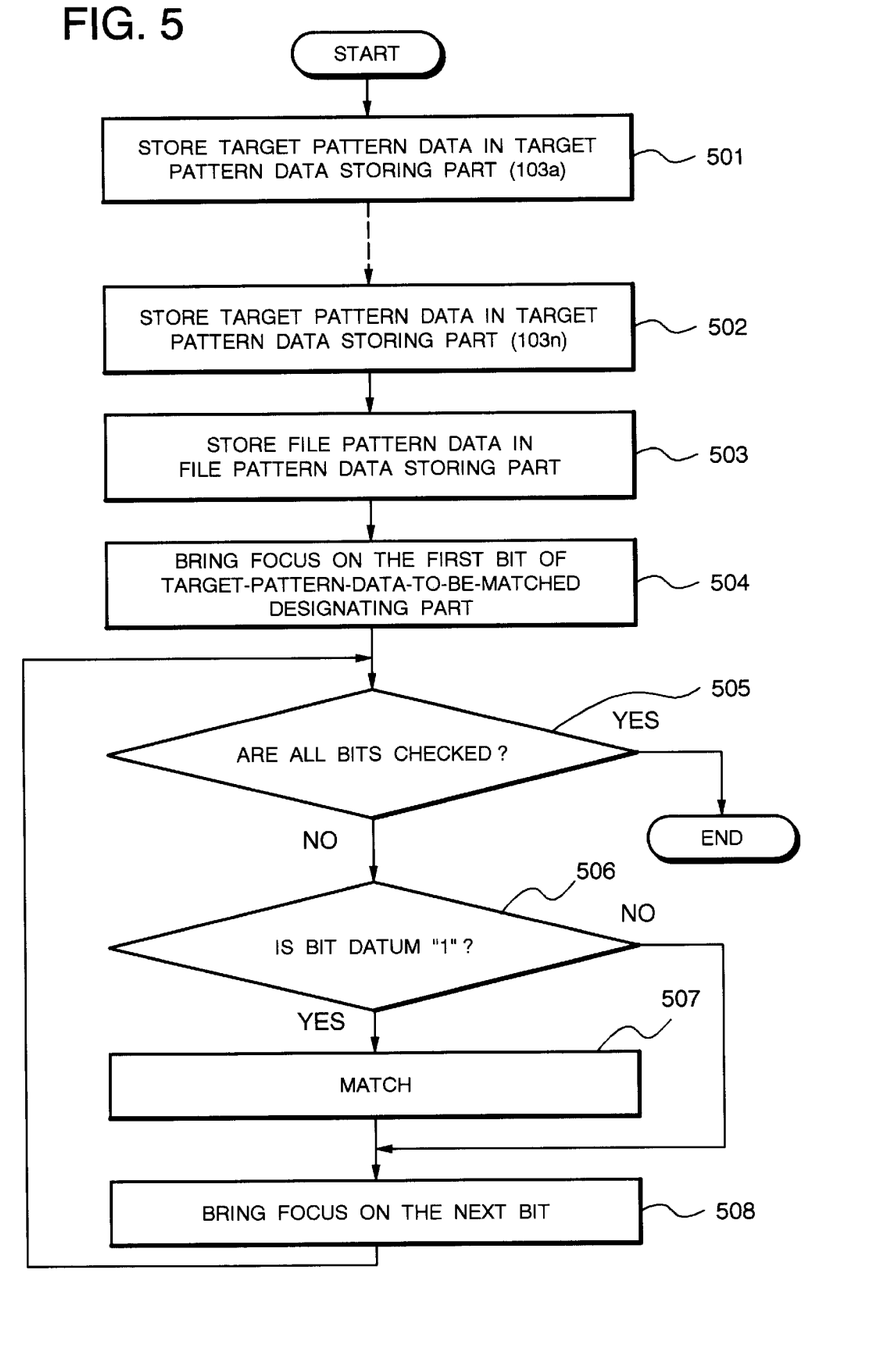
FIG. 5 is a flowchart showing the operation of the present embodiment.

Operation of the present embodiment will be detailed below with reference to the flowchart in FIG. 5. First, the matching controller 110 transfers one set of target pattern data to be verified to the pattern data matching device 100. In accordance with the control by the data processing part 102, the pattern data matching device 100 stores the target pattern data that it has received from the matching controller 110 in the data inputting part 101. Then, the data processing part 102 converts the target pattern data that are stored in the data inputting part 101 into a data format suitable for a matching process, and stores them in the target pattern data storing part 103a (Step 501). The reason for converting the data format here when storing the target pattern data from the data inputting part 101 to the target pattern data storing part 103a is that, since which specific data format are to be handled by the matching controller is not prescribed, target pattern data as are input from the matching controller can be in a compressed or other format that cannot be handled by the pattern data matching device 100. Also, the data layout may be modified through this conversion process, thereby contributing to a faster processing speed. For the remaining sets of target pattern data, the same procedure takes place; one remaining set of target pattern data to be verified is transferred from the matching controller 110 to the pattern data matching device 100, is stored in the data inputting part 101 of the pattern data matching device 100, and all the remaining sets of target pattern data, after being converted into a data format suited for the matching process, are stored sequentially, resuming with the target pattern data storing part 103b and ending with the target pattern data storing part 103n (Step 502).

Next, the matching controller 110 transfers file pattern data to the pattern data matching device 100. In accordance with the control by the data processing part 102, the pattern data matching device 100 stores the file pattern data that it has received from the matching controller 110 in the data inputting part 101. Then, the data processing part 102 converts the file pattern data that are stored in the data inputting part 101 into a data format suitable for a matching process, and stores them in the file pattern data storing part 104 (Step 503).

Then, the verification data determination part 106 brings its focus on the first bit of the target-pattern-data-to-be-verified designating section in the file pattern data that is stored in the file pattern data storing part 104 (Step 504), and, finding a bit yet to be checked to exist, it determines whether the bit datum is "1" or not (Steps 505 and 506). When the bit datum is "1", it verifies the target pattern data stored in the target pattern data storing parts 103a, which corresponds to this bit, against the related file pattern data (Step 507); it then brings its focus on the next bit (Step 508), and, finding a bit yet to be checked to exist, it repeats the same action on the bit (Step 505). When the bit datum is not "1", on the other hand, it brings its focus on the next bit without matching (Step 508), and, finding a bit yet to be checked to exist, it repeats the same action on the bit (Step 505).

After repeating the action of Step 505 or Step 508 up to the n-th bit that corresponds to the target pattern data storing part 103n, it determines in Step 505 that the checking of all the bits is complete, and terminates the process.

As described in the foregoing, by using the pattern data matching device according to the present invention and its matching method, it is possible to eliminate the wasteful process of transferring the same file pattern data repeatedly for performing verification on each set of target pattern data, since multiple sets of target pattern data are stored and verified against file pattern data in one cycle of matching process. Thus, the effects of reducing the time required for a matching process and consequently increasing efficiency can be obtained.

Since it is quite time consuming to convert file pattern data from the format used in the matching controller to the one used in the pattern data matching device, the present invention also provides the effects of reducing considerably the time required for a matching process by eliminating the necessity to convert the same file pattern data repeatedly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A pattern data matching device for matching target pattern data which are pattern data taken for verification against file pattern data which are pattern data prepared beforehand for verification, said pattern data having characteristic points, said device comprising:

a matching controller storing file pattern data and target pattern data to be verified;

multiple target pattern data storing means for storing multiple sets of said target pattern data transferred from the matching controller, each set corresponding to a portion of characteristic point information in said target pattern;

file pattern data storing means for storing said file pattern data transferred from the matching controller; and matching means for matching necessary sets of said target pattern data stored in said multiple target pattern data storing means against said file pattern data stored in said file pattern data storing means, said file pattern data having a designation information bit corresponding to each set, indicating whether or not each said target pattern data set is to be verified, for each said target pattern data set, said matching means verifying said target pattern data set against said file pattern data when said designation information indicates said target pattern data set is to be verified.

2. The pattern data matching device as set forth in claim 1, further comprising:

a verification data determination means for checking said designation information in said file pattern data, and directing said matching means to verify said target pattern data indicated in said designation information against said file pattern data.

3. The pattern data matching device as set forth in claim 1, further comprising:

a data holding means for storing said target pattern data transferred from the matching controller and said file pattern data temporarily, wherein said target pattern data and said file pattern data stored in said data holding means are converted as necessary into a data format that is handled by said matching means, and are stored in said target pattern data storing means and said file pattern data storing means.

4. The pattern data matching device as set forth in claim 1, further comprising:

a data holding means for storing said target pattern data transferred from the matching controller and said file pattern data temporarily, wherein said target pattern data and said file pattern data stored in said data holding means are converted as necessary into a data format that is handled by said matching means, and are stored in said target pattern data storing means and said file pattern data storing means, and when designation information that designates said target pattern data to be verified is included in said file pattern data, said matching means verifies said target pattern data indicated in such designation information against said file pattern data.

5. A data matching method in a pattern data matching device for matching target pattern data which are pattern data taken for verification against file pattern data which are pattern data prepared beforehand for verification, each pattern data having characteristic points, said method comprising:

storing file pattern data and target pattern data to be verified in a matching controller;

transferring multiple sets of said target pattern data from the matching controller and storing the multiple sets of said target pattern data, each set corresponding to a portion of characteristic point information in said target pattern;

transferring said file pattern data from the matching controller and storing said file pattern data; and matching necessary sets of said target pattern data of said multiple sets of said target pattern data stored against said file pattern data, said file pattern data having a designation information bit corresponding to each set, indicating whether or not each said target pattern data set is to be verified, for each said target pattern data set, said matching verifying said target pattern data set against said file pattern data when said designation information bit indicates said target pattern data set is to be verified.

6. The data matching method as set forth in claim 5, further comprising:

checking said designation information in said file pattern data, and directing said matching to verify said target pattern data indicated in said designation information against said file pattern data.

7. The data matching method as set forth in claim 5, wherein, in storing said target pattern data and storing said file pattern data, said target pattern data and said file pattern data transferred from the matching controller are converted as necessary into a data format that is handled by said data matching and are stored.

8. The data matching method as set forth in claim 5, wherein, in said storing said target pattern data and said storing said file pattern data, said target pattern data and said file pattern data transferred from the matching controller are converted as necessary into a data format that is handled by said data matching and are stored; and determining said target pattern data to be verified against said file pattern data in accordance with such designation information before conducting said data matching when said file pattern data stored includes designation information that designates said target pattern data to be verified.

9. A pattern data matching device for matching target pattern data which are pattern data taken for verification against file pattern data which are pattern data prepared beforehand for verification, comprising:

a matching controller storing file pattern data and target pattern data to be verified;

a multiple target pattern data storing device for storing multiple sets of said target pattern data transferred from the matching controller, each set corresponding to a portion of characteristic point information in said target pattern;

a file pattern data storing device for storing said file pattern data transferred from the matching controller; and a matching device for matching necessary sets of said target pattern data stored in said multiple target pattern data storing device data storing device against said file pattern data stored in said file pattern data storing device, said file pattern data having a designation information bit corresponding to each set, indicating whether or not each said target pattern data set is to be verified, for each said target pattern data set, said matching device verifying said target pattern data set against said file pattern data when said designation information bit indicates said target pattern data set is to be verified.

10. The pattern data matching device as set forth in claim 9, further comprising:

a verification data determination device for checking said designation information in said file pattern data, and directing said matching device to verify said target pattern data indicated in said designation information against said file pattern data.

11. The pattern data matching device as set forth in claim 9, further comprising:

a data holding device for storing said target pattern data transferred from the matching controller and said file pattern data temporarily, wherein said target pattern data and said file pattern data stored in said data holding device are converted as necessary into a data format that is handled by said matching device, and are stored in said target pattern data storing device and said file pattern data storing device.

12. The pattern data matching device as set forth in claim 9, further comprising:

a data holding device for storing said target pattern data transferred from the matching controller and said file pattern data temporarily, wherein said target pattern data and said file pattern data stored in said data holding device are converted as necessary into a data format that is handled by said matching device, and are stored in said target pattern data storing device and said file pattern data storing device, and when designation information that designates said target pattern data to be verified is included in said file pattern data, said matching device verifies said target pattern data indicated in such designation information against said file pattern data.

* * * * *